United States Patent
Suzuki et al.

(10) Patent No.: US 7,072,409 B2
(45) Date of Patent: Jul. 4, 2006

(54) SPACE MULTIPLEX RADIO COMMUNICATION METHOD AND RADIO COMMUNICATION APPARATUS

(75) Inventors: Yasunori Suzuki, Yokohama (JP); Tetsuo Hirota, Minato-ku (JP); Toshio Nojima, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 662 days.

(21) Appl. No.: 09/861,717

(22) Filed: May 22, 2001

(65) Prior Publication Data
US 2002/0003842 A1    Jan. 10, 2002

(30) Foreign Application Priority Data
May 23, 2000    (JP)    ............................. 2000-151493

(51) Int. Cl.
*H04L 27/00*    (2006.01)
(52) U.S. Cl. .................. 375/259; 178/66.1; 327/1; 327/100; 375/260; 375/267; 375/299; 455/132; 455/504
(58) Field of Classification Search ............... 375/142, 375/144, 146, 147, 148, 150, 346, 347, 349, 375/299, 267, 259; 370/320, 335, 342, 479
See application file for complete search history.

(56) References Cited

U.S. PATENT DOCUMENTS

| | | | |
|---|---|---|---|
| 5,634,199 A | | 5/1997 | Gerlach et al. |
| 5,781,845 A | | 7/1998 | Dybdal et al. |
| 6,259,688 B1 | * | 7/2001 | Schilling et al. ............. 370/342 |
| 6,452,981 B1 | * | 9/2002 | Raleigh et al. ............. 375/299 |
| 6,532,254 B1 | * | 3/2003 | Jokinen ..................... 375/148 |
| 6,549,565 B1 | * | 4/2003 | Buehrer et al. ............. 375/142 |

* cited by examiner

*Primary Examiner*—Chieh M. Fan
*Assistant Examiner*—Erin M. File
(74) *Attorney, Agent, or Firm*—Oblon, Spivak, McClelland, Maier & Neustadt, P.C.

(57) ABSTRACT

A radio communication system is comprised of: a transmitting system in which N transmission signals, frequency-converted to the same transmission frequency, are generated by N transmitters, N being an integer equal to or greater than 2, and the transmission signals are each applied to each one of N elements of an antenna for transmission; and a receiving system in which each transmitted signal is received by N-element antenna and the cross correlation coefficient between the transmitted signals received by the N-elements is minimized to thereby reconstruct each transmitted signal. The plural transmitted signals of the same frequency are received and the cross correlation coefficients of the received transmitted signals are minimized to thereby permit multiplexing of the transmission signal.

10 Claims, 13 Drawing Sheets

TRANSMITTING SIDE    RECEIVING SIDE

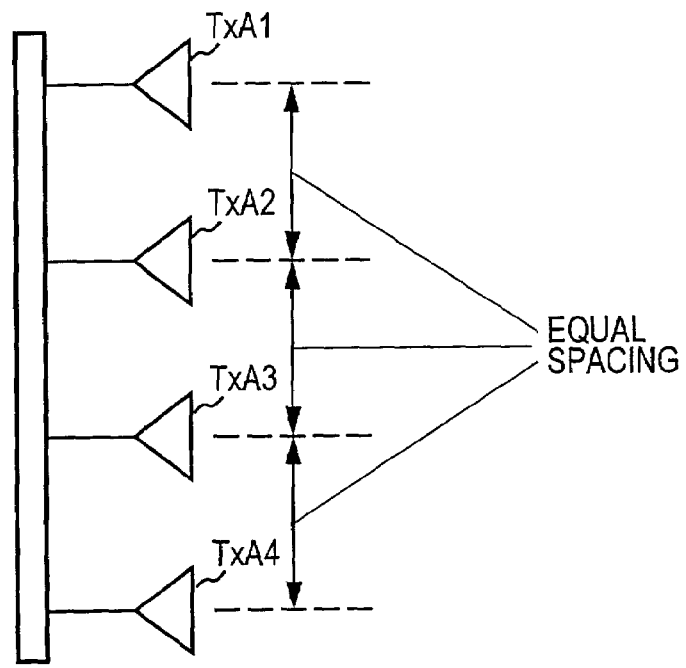
FIG. 12A  LINEAR ARRAY ANTENNA
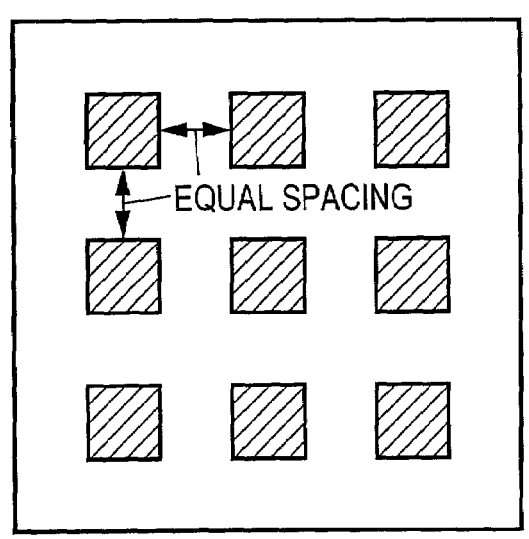
FIG. 12B  PATCH ARRAY ANTENNA

SPACE MULTIPLEX RADIO COMMUNICATION METHOD AND RADIO COMMUNICATION APPARATUS

BACKGROUND OF THE INVENTION

The present invention relates to a radio communication method and apparatus that use N transmitters, an N-element transmitting/receiving antenna and N receivers and conduct N-channel space multiplexing through minimization of the cross correlation between N-channel transmission signals.

With the recent rapid widespread use of mobile communications, there is a growing demand for a radio communication scheme that achieves high frequency utilization efficiency. A common definition of the frequency utilization efficiency can be given by the ratio between the channel capacity and the magnitude of the spectral space used. The spectral space herein mentioned is the product of the frequency bandwidth used, the magnitude of the physical space occupied and the time consumed. The frequency utilization efficiency thus defined can be enhanced by (1) increasing the channel capacity, (2) reducing the frequency bandwidth, (3) decreasing the physical space, and (4) shortening the time of use.

For example, in a digital modulation system, the channel capacity per unit frequency can be increased by multilevel. An example of this scheme is the increase from 16 QAM (Quadrature Amplitude Modulation) to 250 QAM in microwave communications. An example of the reduction of the frequency bandwidth is an interleaved channel assignment in mobile communications. An example of the physical space reduction scheme is the implementation of a micro cell as in PHS (Personal Handyphone System). An example of time reduction scheme is the implementation of half rate speech coding in PDC (Personal Digital Cellular) through utilization of a fill rate speech coding technique.

As mentioned above, the frequency utilization efficiency is increased by the combined use of various radio transmission techniques. For example, in PDC, three or six speech channels are multiplexed in each sector of a three-sector cell by a combination of such techniques as frequency assignment by a sector scheme, high-efficiency speech coding and time division multiple access.

Further enhancement of the frequency utilization efficiency requires the use of a method that reduces the number of guard bands between carrier frequencies or uses the same frequency in plural channels in the same area. For example, in the CDMA (Code Division Multiple Access) mobile communication, orthogonal spreading codes are used to identify each communication channel. The communication channels identified by the spreading codes are multiplexed at the same carrier frequency. If N carriers can be used in the same area through utilization of the conventional radio channel multiplexing techniques, the frequency utilization efficiency could be made N-fold as compared with the conventional radio communication methods that are allowed to use one carrier in the same area. In practice, however, the channel capacity is limited by interference between other channels due to degradation of the orthogonality between radio channels.

SUMMARY OF THE INVENTION

It is therefore an object of the present invention to provide a space multiple communication method and apparatus and receiving method and apparatus wherein even if signals of plural channels are multiplexed at one frequency from plural transmitters, the receiving side is capable of separating the received signals of the respective channels.

According to an aspect of the present invention, an N-channel space multiplex radio communication method comprises the steps of:

(a) generating transmission signals of N channels frequency converted to the same transmitting frequency by N independent transmitters, said N being an integer equal to or greater than 2, and providing said transmission signal of said N channels to N elements of a transmitting antenna for transmission therefrom; and (b) receiving said transmission signals of said N channels by N elements of a receiving antenna, respectively, to generate received signals of N channels, and reconstructing said transmission signals by minimizing the cross correlation between said received signals of said N channels.

According to another aspect of the present invention, a radio communication apparatus comprises:

N independent transmitters, said N being an integer equal to or greater than 2;

a transmitting antenna provided with N elements which are supplied with N transmitter outputs, respectively;

a receiving antenna provided with N elements;

an inter-channel interference canceller, supplied with the outputs from said N elements of said receiving antenna, for generating inverse functions of spatial transfer functions between said n elements of said transmitting antenna and said N elements of said receiving antenna; and N receivers for receiving the respective outputs from said inter-channel interference canceller.

According to another aspect of the present invention, a method for receiving N-channel space multiplex signals transmitted from N elements of a transmitting antenna comprises the steps of:

(a) receiving N-channel transmitted signals by N elements of a receiving antenna to generate N-channel received signals;

(b) dividing each of said N-channel received signals to obtain signals of N×N paths, then weighting said signals of said N×N paths by weighting factors, respectively, and combining said weighted signals for every N channels to obtain N-channel combined signals; and (c) monitoring said N-channel combined signals, and reconstructing said N-channel transmitted signals by setting said weighting factors so that the cross correlations between said N-channel received signals are minimized.

According to still another aspect of the present invention, an apparatus for receiving N-channel transmitted signals from N elements of a transmitting antenna comprises:

a receiving antenna provided with N elements, said N being an integer equal to or greater than 2;

an N-input-N-output inter-channel interference canceller supplied with N-channel received signals from said N elements of said receiving antenna, for dividing said N-channel received signals to N signals of N×N paths, for weighting said divided N signals of said N×N paths, for combining said weighted N signals for every N channels to generate N-channel combined signals, and for controlling, based on said N-channel combined signals, said weighting factors so that the cross correlations between said N-channel received signals are minimized; and N receivers supplied with respective outputs from said inter-channel interference canceller.

BRIEF DESCRIPTION OF THE DRAWINGS

FIG. 12 is a diagram showing examples of transmitting and receiving antennas according to the present invention.

DETAILED DESCRIPTION OF THE PREFERRED EMBODIMENTS

Figure 1:
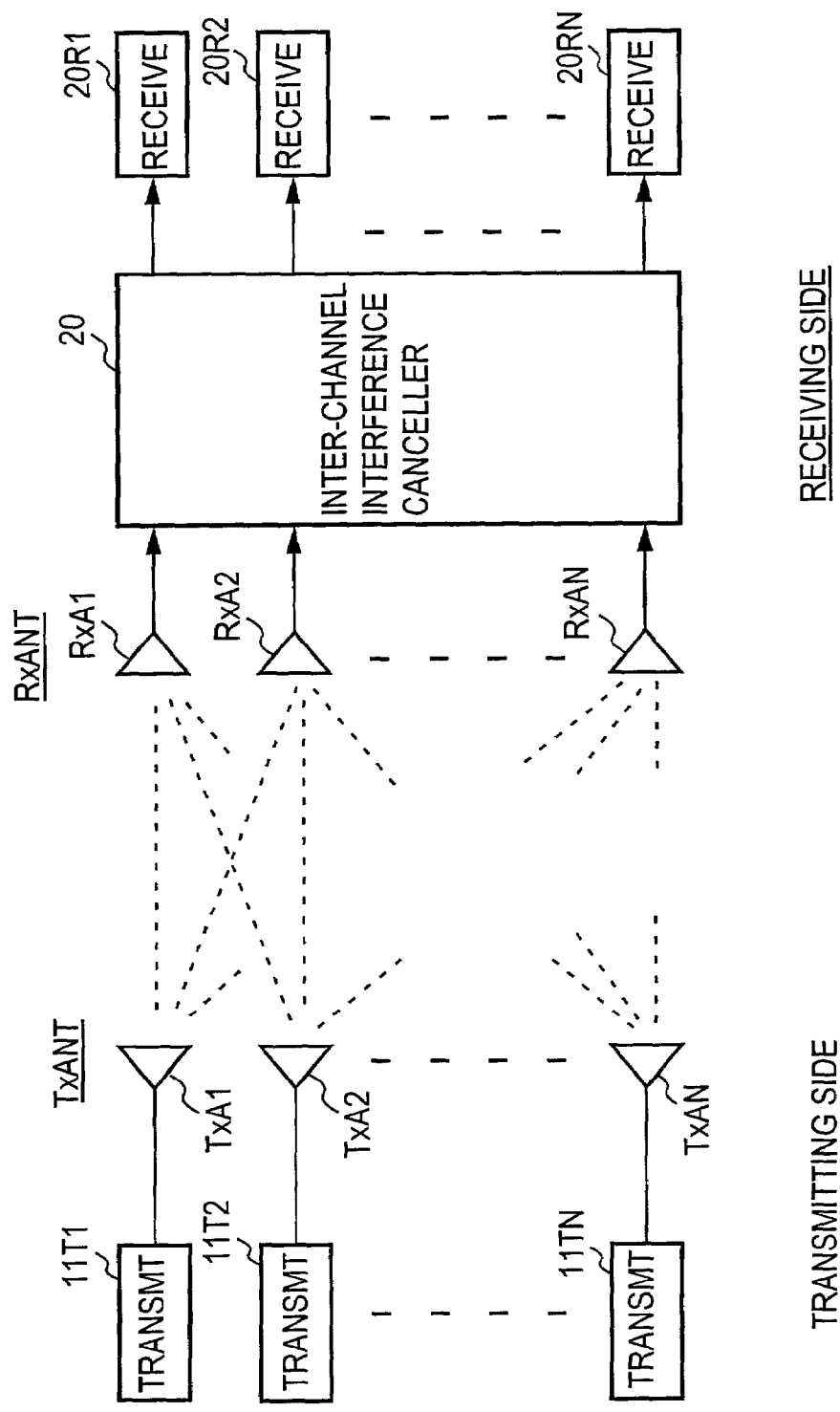
FIG. 1 is a block diagram depicting the basic construction of the present invention.

FIG. 1 is a diagrammatic showing of the basic construction of the present invention.

The radio communication apparatus according to the present invention basically comprises: a transmitting system composed of N transmitters 11T1 to 11TN and a transmitting antenna TxANT of N elements TxA1 to TxAN; and a receiving system composed of a receiving antenna RxANT of N elements RxA1 to RxAN, N-input-N-output inter-channel interference canceller 20 and N receivers 20R1 to 20RN. The inter-channel interference canceller 20 minimizes the cross correlation between N input signals and generates N output signals.

Figure 2:
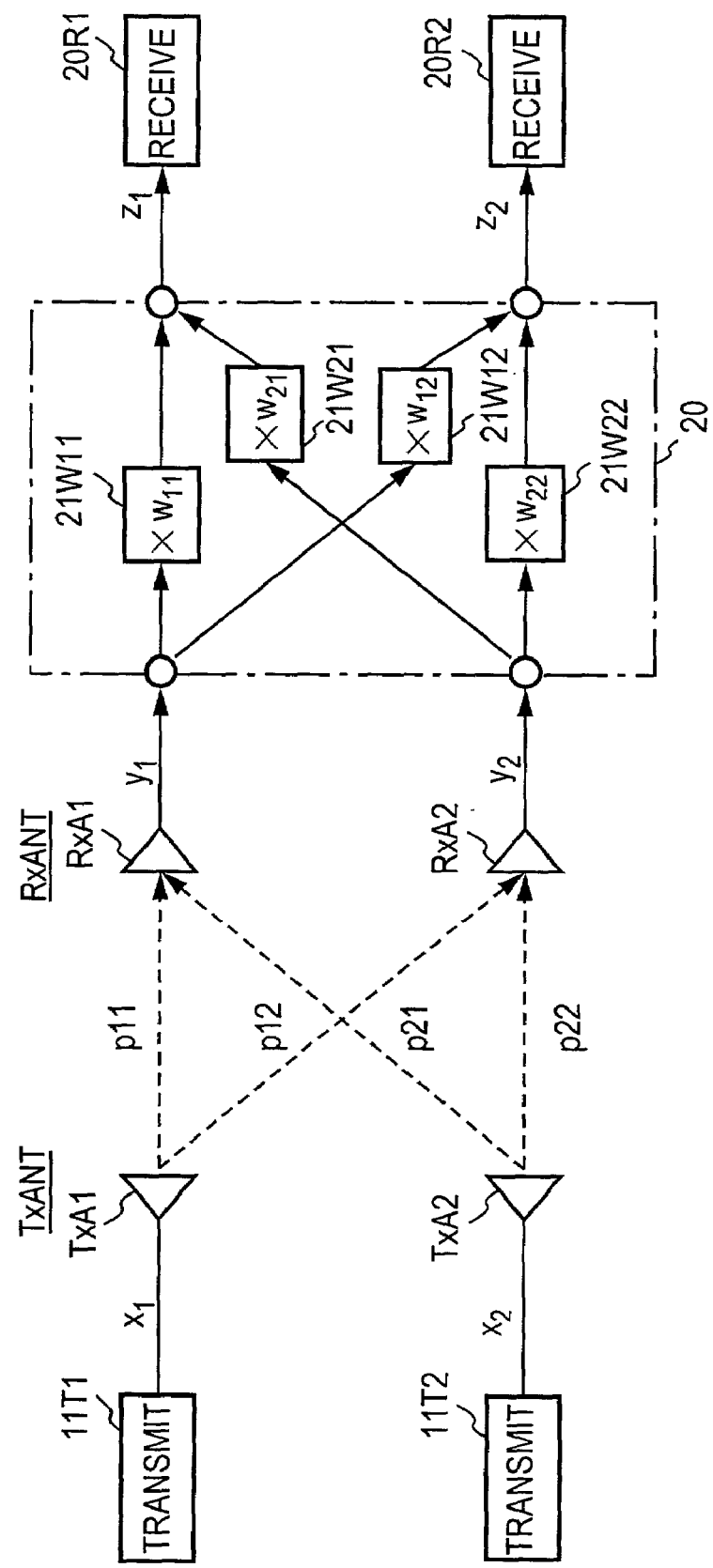
FIG. 2 is a block diagram illustrating a concrete example of the basic construction of the present invention.

Next, the principles of the present invention will be described concretely. For brevity sake, the description will be given of a transmitter-receiver of N=2 channels as depicted in FIG. 2. The paths from the transmitting antenna element TxA1 to the receiving antenna elements RxA1 and RxA2 are indicated by p11 and p12, respectively, and the paths from the transmitting antenna element TxA2 to the receiving antenna elements RxA1 and RxA2 are indicated by p21 and p22, respectively. Disposed between the antenna elements RxA1 to RxAN of the receiving antenna RxANT is the N-channel inter-channel interference canceller 20.

Assuming that the distance between the transmitting antenna TxANT and the receiving antenna RxANT is sufficiently longer than the element spacing of the antennas, the transfer function $p_{ij}$ of each path ij is given by the following equation (1) wherein $a_{ij}$ and $\theta_{ij}$ are attenuation and phase coefficients of the path ij.

$$p_{ij}=a_{ij}e^{j\theta_{ij}} \quad (1)$$

Letting x represent transmission signal sequences that are transmission signals $x_1$ and $x_2$ from the respective transmitters 11T1 and 11T2, y represent received signal sequences that are received signals $y_1$ and $y_2$ of the respective receiving antennas RxA1 and RxA2, and P represent a transfer function matrix from the transmitting antenna TxANT to the receiving antenna RxANT, $$y=Px \quad (2)$$

$$x=(x_1 x_2)^T \quad (3)$$

$$y=(y_1 y_2)^T \quad (4)$$

$$P = \begin{pmatrix} p_{11} & p_{21} \\ p_{12} & p_{22} \end{pmatrix} \quad (5)$$

Let the weighting factors of the paths from the receiving antenna element RxA1 to the receivers 20R1 and 20R2 be represented by $w_{11}$ and $w_{12}$, the weighting factors of the paths from the receiving antenna element RzA2 to the receivers 20R1 and 20R2 by $W_{21}$ and $W_{22}$, and a weighting factor matrix by W. Letting the input signals to the respective receivers 20R1 and 20R2 be represented by $z_1$ and $z_2$, and the input signal sequence by z, $$z=Wy \quad (6)$$

$$W = \begin{pmatrix} w_{11} & w_{21} \\ w_{12} & w_{22} \end{pmatrix} \quad (7)$$

$$z=(z_1 z_2)^T \quad (8)$$

From Equations (2) and (6) it follows that $$\begin{aligned} z &= WPx \\ &= \begin{pmatrix} p_{11}w_{11}+p_{21}w_{12} & p_{11}w_{21}+p_{21}w_{22} \\ p_{12}w_{11}+p_{22}w_{12} & p_{12}w_{21}+p_{22}w_{22} \end{pmatrix}\begin{pmatrix} x_1 \\ x_2 \end{pmatrix} \end{aligned} \quad (9)$$

In this case, by using a matrix W that renders the matrix WP of Equation (9) into diagonal form, it is possible to cancel inter-channel interference or the like on the paths between the transmitting antenna TxANT and the receiving antenna RxANT. That is, by determining the weighting factors $w_{11}$, $w_{12}$, $w_{21}$ and $w_{22}$ so that the matrix elements become $$p_{11}w_{21}+p_{21}w_{22}=0$$

$$p_{12}w_{11}+p_{22}w_{12}=0 \quad (10)$$

transmitted N-channel signals can be reconstructed at the receiving side. The present invention achieves diagonalization of the matrix WP through manipulation of the weighting factor matrix W.

Figure 3:
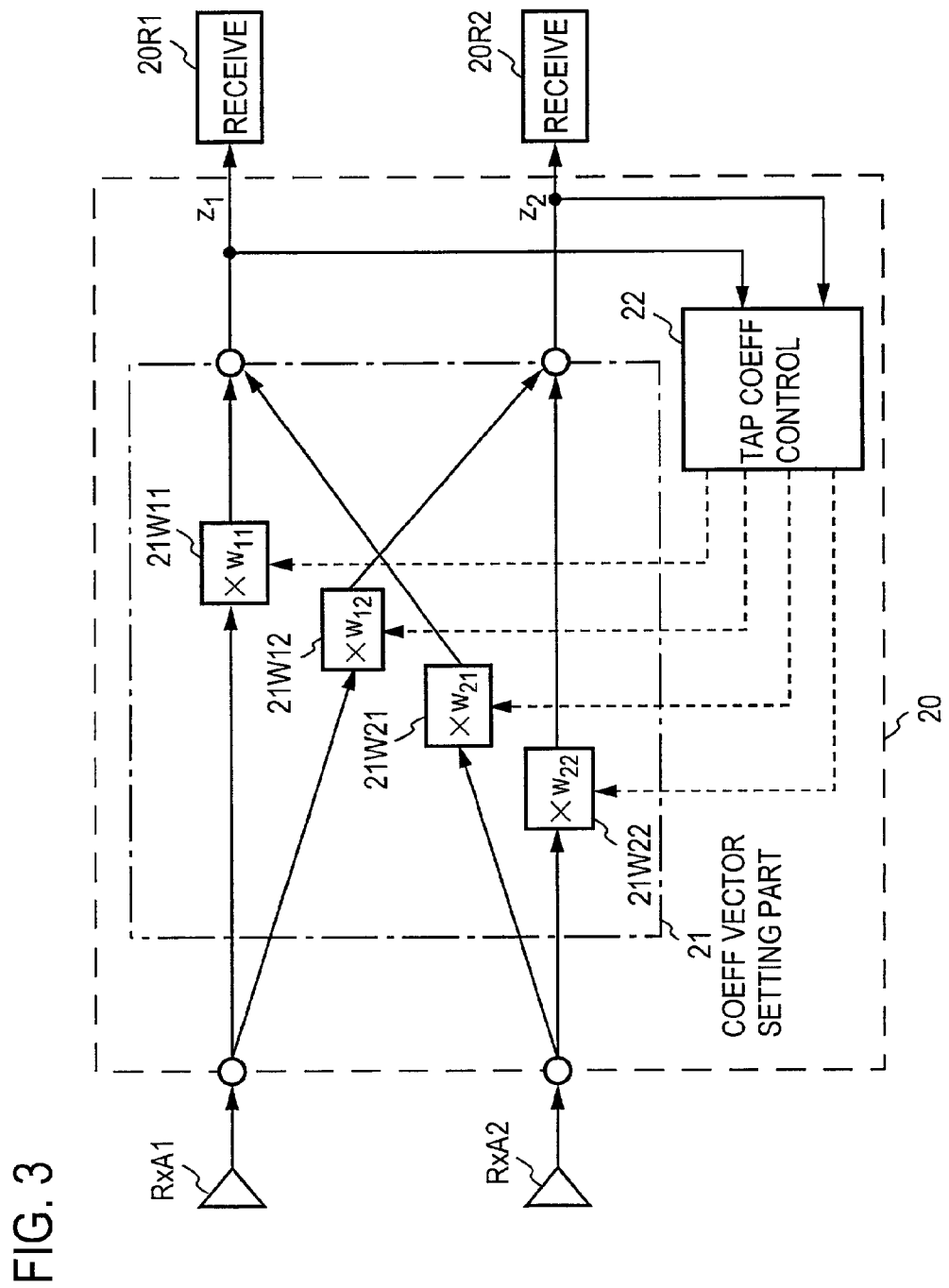
FIG. 3 is a block diagram illustrating the basic construction for diagonalization of a matrix WP according to the present invention.

FIG. 3 shows the basic configuration for diagonaliation of the matrix WP in the case where the number N of channels is two. In FIG. 3 the inter-channel interference canceller 20 is provided with a coefficient vector setting part 21 and a tap coefficient controller 22. The coefficient vector setting part 21 consists of coefficient multipliers 21 Wi1 and 21 Wi2 inserted in the paths between each antenna element RxAi (where i=1, 2) and the receivers 20R1 and 20R2, for multiplying the input signals on the respective paths by weighting factors $w_{i1}$ and $w_{i2}$.

The tap coefficient controller 22 monitors the receiver input signal sequence $z(z_1, z_2)$, and adaptively controls the weighting factor of each path. The diagonaliation of a correlation matrix of the signal sequence z permits diagonalization of the matrix WP. That is, for each one of channels the weighting factor matrix W removes signals from those unwanted transmitting antenna elements corresponding to the other channels from the received signal of that channel. The correlation matrix can be adaptively diagonalized using a least square estimation method or the like. Such an estimation algorithm is commonly used for adaptive signal processing. The present invention also allows the use of such signal processing.

Next, a description will be given of how to initialize the weighting factor matrix W. Although N=2 in FIG. 3, N will herein below be an arbitrary integer equal to or greater than 2. Usually the transfer function of a propagation path is unknown. On this account, the present invention sets the weighting factor matrix W at the receiving side prior to the start of a radio communication. In the first place, all weighting factors are initialized to ones, for instance. This is followed by radiating radio waves sequentially from the transmitting antenna elements TxAi, where i=1, 2, . . . , N, and setting the factor $w_{ij}$ of the weighting factor matrix W to a value that maximizes the received input level of the receiver 20Rj (where j=i) corresponding to the transmitting antenna TxAi but minimizes the received input levels of the other receivers 20Rj (where j≠i). By performing this manipulation for all of the N transmitting antenna elements TxA1 through TxAN, it is possible to set the factors $w_{11}$ to $w_{NN}$ of the weighting factor matrix W with N rows and N columns.

Figure 4:
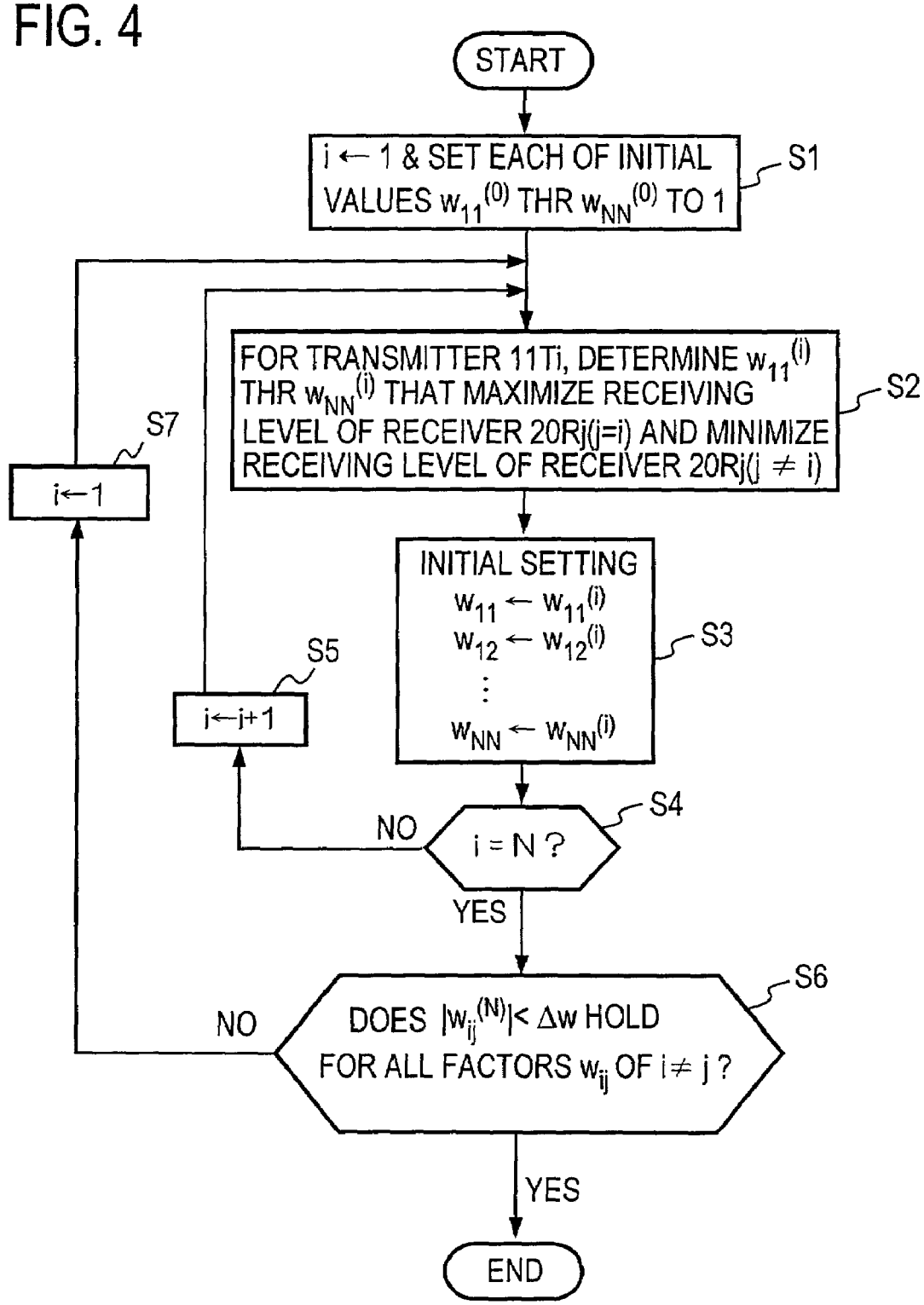
FIG. 4 is a flowchart showing an example of the procedure for diagonalization of the matrix WP.

FIG. 4 shows an example of the procedure for diagonalizing the matrix WP by updating the initialized weighting factors $w_{11}$, through $w_{NN}$.

Step S1: Set all initial values $w_{11}^{(0)}$ through $w_{NN}^{(0)}$ of the weighting factors $w_{11}$ through $w_{NN}$ of the factor multipliers 21W11 through 21WNN to ones by the tap coefficient controller 22, and set i=1.

Step S2: Transmit a signal from an i-th transmitter 11Ti, then determine factors $w_{11}^{(i)}$ through $w_{NN}^{(i)}$ on a stepwise basis by an adaptive algorithm that maximize the received level of the receiver 20Rj (where j=i) corresponding to the i-th transmitter 11Ti but minimize the received levels of the other receivers 20Rj (where j≠i), and stores the factors thus determined.

Step S3: Set the factors $w_{11}^{(i)}$ through $w_{NN}^{(i)}$ thus determined in step S2 as updated factors in the factor multipliers 21W11 through 21WNN.

Step S4: Make a check to see if i=N holds.

Step S5: If i=N does not hold, increment the value i by one, then return to step S2, and carry out the same processing for the next transmitter.

Step S6: When it is found in step S4 that i=N, make a check to determine if absolute values of factors $w_{ij}^{(N)}$ (i≠j) of non-diagonal elements of the weighting factor matrix $w^{11(N)}$ through $w_{NN}^{(N)}$ are all smaller than a predetermined value Δw, and if so, then finish the procedure.

Step S7: If it is found in step S6 that even one of the absolute values of the non-diagonal elements is not smaller than Δw, reset the value i to 1, then return to step S2, and repeat the factor updating for each transmitter 11Ti.

As describe above, the weighting factors $w_{11}$ through $w_{NN}$ are updated until the cross correlation elements of the matrix WP reach values below a predetermined design value (for example, 0.01 or below).

Figure 5:
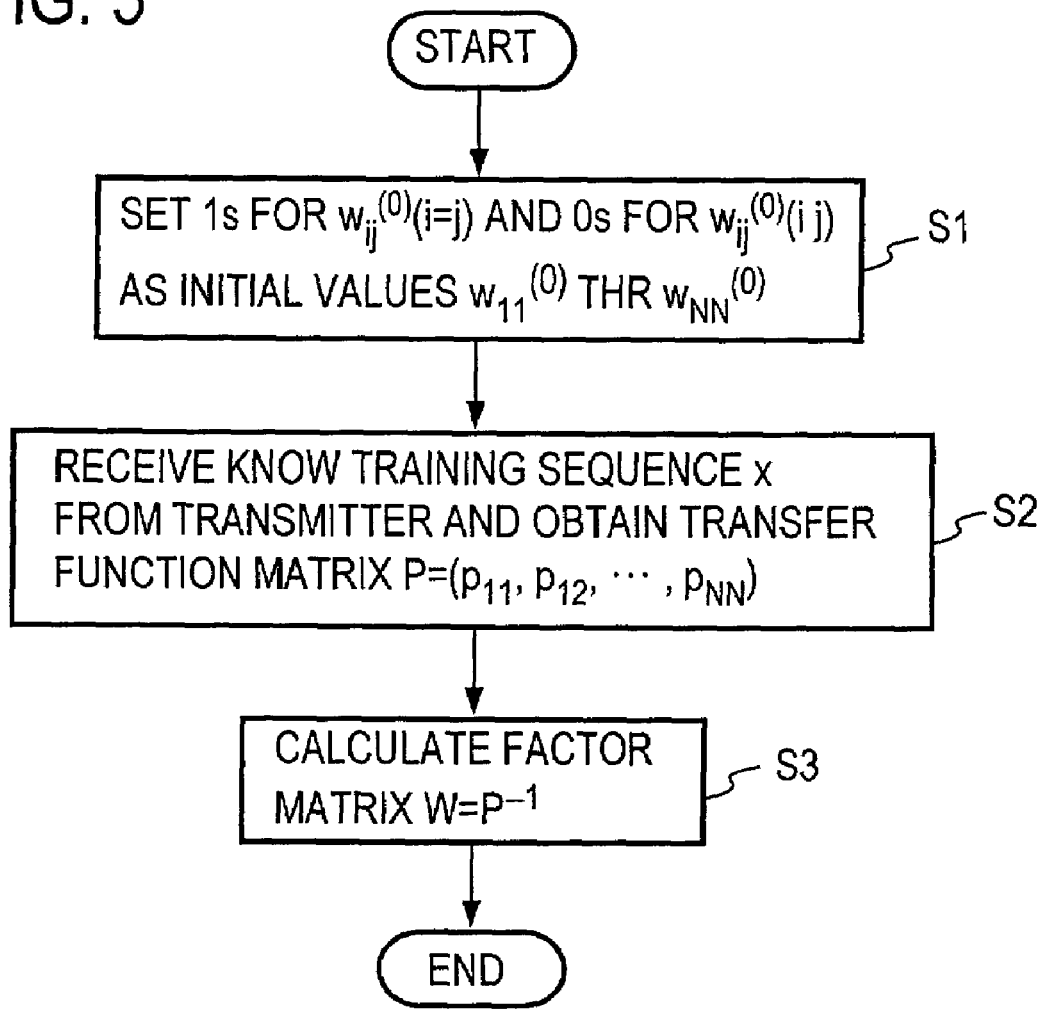
FIG. 5 is a flowchart showing another example of the procedure for diagonalization of the matrix WP.

The weighting factor matrix W can also be calculated by one operation from a known transmission signal x and the corresponding received signal z without using an adaptive algorithm. That is, in Equation (9) the weighting factor matrix W is calculated by one operation after transmitting known sequences (training sequences) as transmission signals for weighting factor setting use from the transmitters 11T1 through 11TN and receiving all the signals by the receivers 20R1 through 20RN. FIG. 5 shows the procedure therefor.

Step S1: Set in the factor multipliers 21W11 through 21WNN, as initial factor values $w_{11}^{(0)}$ through $w_{NN}^{(0)}$, for example, ones for all the diagonal elements $w_{ij}^{(0)}$ (where i=j) and zeroes for all the non-diagonal elements $w_{ij}^{(0)}$ (where i≠j).

Step S2: Receive, by the receiving antenna elements RxA1 through RxAN, known training sequences x ($x_1$, $x_2$, . . . , $x_N$) sequentially sent from the respective transmitters 11T1 through 11TN. More specifically, in the first place, for example, the transmitter 11T1 alone sends a signal, and he receiving antenna elements RxA1 through RxAN receive the transmitted signal. In the factor multipliers, since there have been set the diagonal element factors $w_{ij}^{(0)}$=1 (i=j) and the non-diagonal element factors $w_{ij}^{(0)}$=0 (i≠j), none of the signals received by the respective receiving antenna elements RxA1 through RxAN is combined with any other received signal but instead they are detected intact by the corresponding receivers 20R1 through 20RN. Let $z_{ij}$ represent the signal sent from the transmitter 11T1 and received by the receiving antenna element RxAj. Next, a signal is sent from the transmitter 11T2 and is similarly received. In this way such signal transmission and reception is repeated for every transmitter. Let $z_{ij}$ represent the signal sent from the transmitter 11Ti and received by the receiving antenna element RxAj. Thus, the following matrix Z is obtained.

$$Z = \begin{pmatrix} z_{11} & z_{12} & \cdots & z_{1N} \\ z_{21} & z_{22} & & z_{2N} \\ \vdots & & \ddots & \\ z_{N1} & z_{N2} & \cdots & z_{NN} \end{pmatrix} \quad (11)$$

The matrix Z thus obtained is equivalent to the calculation of transfer functions from the respective transmitters to the respective receiving antenna elements; therefore, Z=P.

Step S3: Calculate an inverse matrix of the transfer function matrix P in which the matrix W) in Equation (9) is a unit matrix. For example, in the case of N=2.

$$W = P^{-1} = \frac{1}{p_{11}p_{22} - p_{21}p_{12}} \begin{pmatrix} p_{22} & -p_{12} \\ -p_{21} & p_{11} \end{pmatrix}$$

$$\frac{1}{z_{11}z_{22} - z_{21}z_{12}} \begin{pmatrix} z_{22} & -z_{12} \\ -z_{21} & z_{11} \end{pmatrix} \qquad (12)$$

Embodiments

Figure 6:
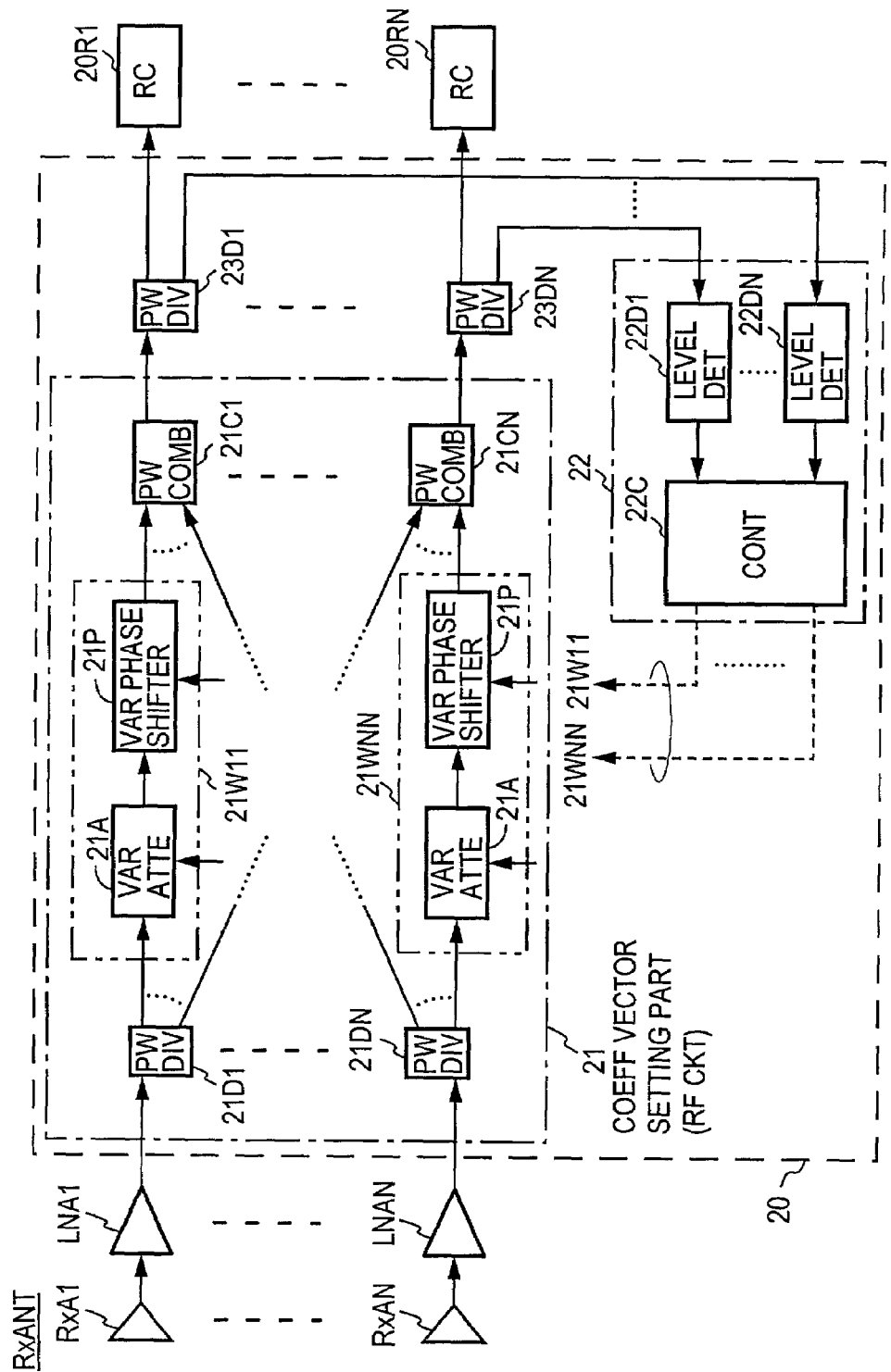
FIG. 6 is a block diagram illustrating a first embodiment of the present invention.

FIG. 6 illustrates in block form a first embodiment of the invention that implements the inter-channel interference canceller 20 in an RF circuit.

The first embodiment comprises: a receiving antenna RxANT composed of N antenna elements RxA to RxAN; receiving amplifiers LNA1 to LNAN; the inter-channel interference canceller 20; and receivers 20R1 to 20RN. The inter-channel interference canceller 20 comprises a coefficient vector setting part 21, a tap coefficient controller 22 and power dividers 23D1 to 23DN. The coefficient vector setting part 21 is made up of N power dividers 21D1 to 21DN, N power combiners 21C1 to 21CN and factor multipliers 21W11 to 21WNN inserted in N×N paths between the N power dividers and the N power combiners. Each factor multipliers 21Wij is formed by a variable attenuator 21A and a variable phase shifter 21P. The tap coefficient controller 22 is formed by a controller 22C and level detectors 22D1 to 22DN.

Each power combiner 21Cj, where j=1, ..., N, combines signals from the factor multipliers 21W1j to 21WNj, and provides the combined signal to the corresponding power divider 23Dj. The power divider 23Dj distributes the input signal to the corresponding receiver 20Rj and level detector 22Dj. The level detector 22Dj detects the level of the input signal, and provides the detected output to the controller 22C. Based on the levels detected by the level detectors 22D1 to 22DN (which levels correspond to the levels of input signals to the receivers 20R1 to 20RN), the controller 22C follows, for example, the procedure described previously with reference to FIG. 4, by which it controls the variable attenuator 21A and the variable phase shifter 21P of the factor multiplier 21Wij in each path pij.

Figure 7:
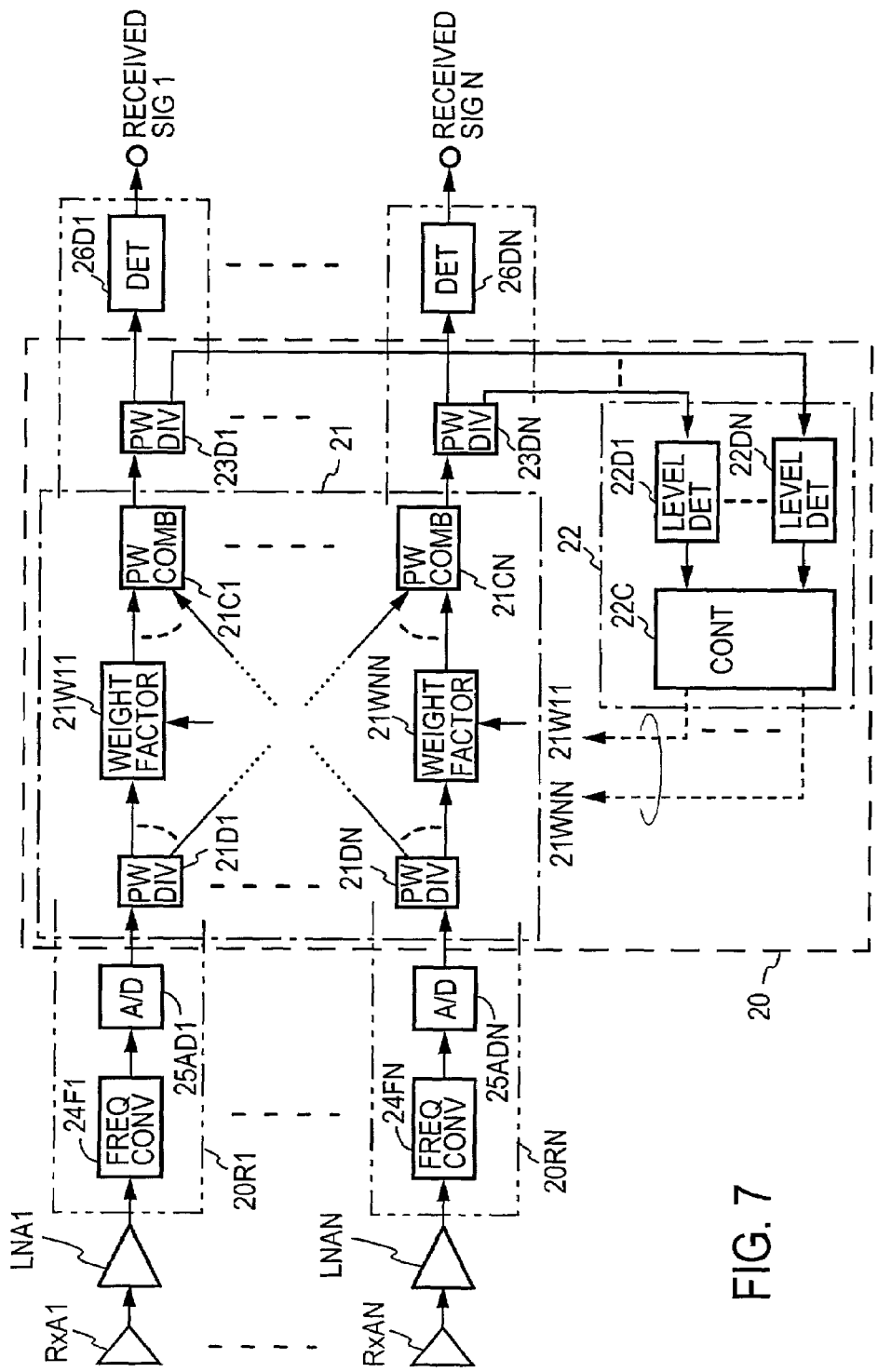
FIG. 7 is a block diagram illustrating a first embodiment of the present invention.

FIG. 7 illustrates in block form a second embodiment that implements the inter-channel interference canceller 20 through digital signal processing.

In FIG. 7 each receiver 20Ri, where i=1, ..., N, has: a frequency converter 24Fi for down-converting the received signal to a low-frequency signal suitable for digital processing; an A/D converter 25ADi for converting the low-frequency signal to a digital signal; and a detector 26Di for detecting the digital signal. Inserted between the A/D converters 25AD1 to 25ADN and the detectors 32D1 to 32DN of the receivers 20R1 to 20RN is the inter-channel interference canceller 20, whose construction is identical with that in the case of FIG. 5. The signals distributed by the power dividers 23D1 to 23DN are level detected by the level detectors 22D1 to 22DN. The controller 22C follows, for example, the procedure of FIG. 4, by which it determines the weighting factors $w_{11}$ to $w_{NN}$. Each power combiner 21Ci may be a digital adder.

Figure 8:
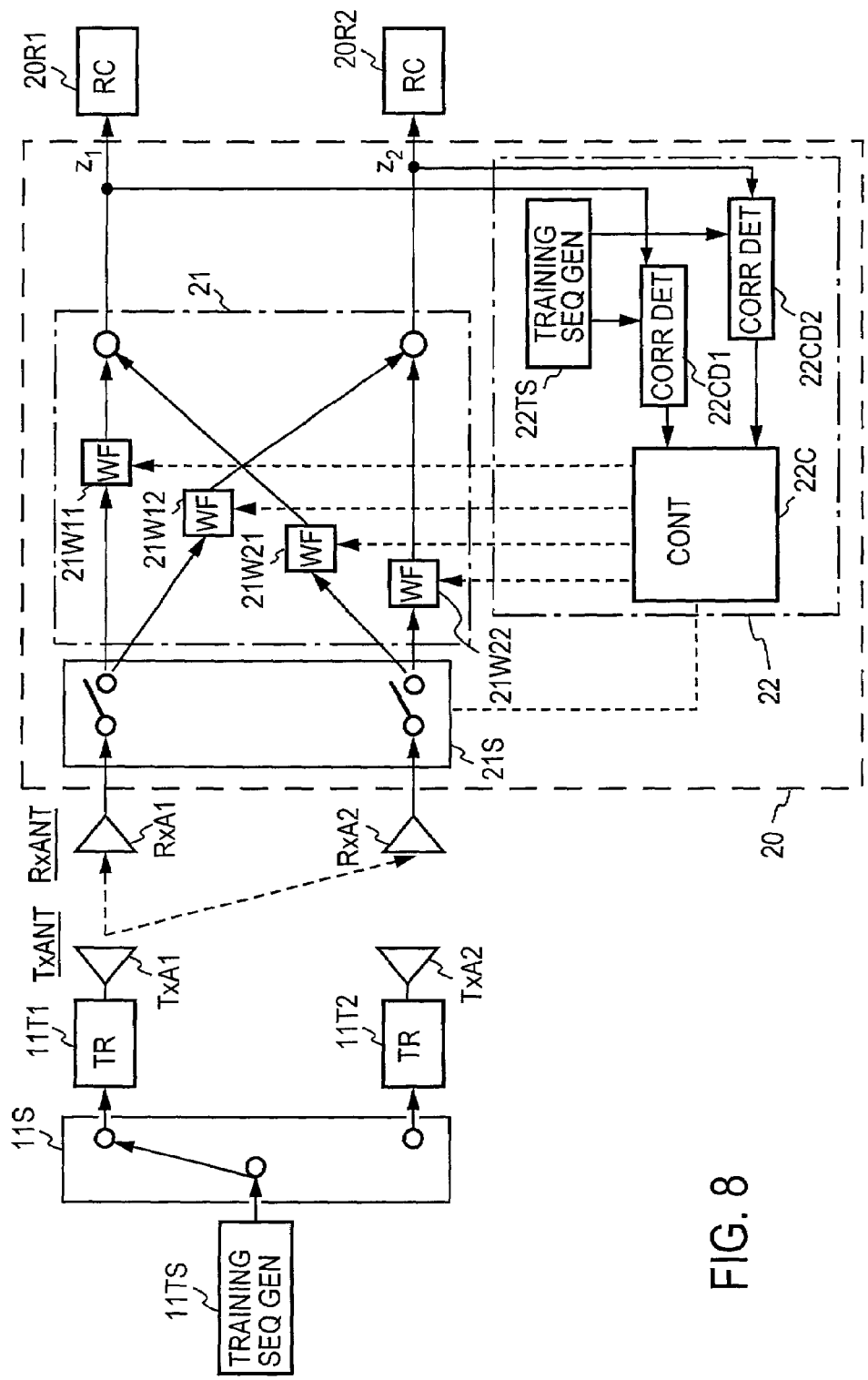
FIG. 8 is a block diagram depicting the configuration of a transmission/reception system according to the present invention.

FIG. 8 shows an example of updating the weighting factors through the use of training sequences.

In this example, N=2, but N may be an arbitrary integer equal to or greater than 2. The transmitting side has a training sequence generator 11TS for generating, as training sequences, pseudo-random noise codes or sequences (PN sequences) of excellent orthogonality, such as M-sequences, and a switch 11S. At the time of setting the weighting factors, the training sequences are provided via the switch 11S to the transmitters 11T1 and 11T2, from which they are sequentially transmitted. The inter-channel interference canceller 20 at the receiving side is made up of a switch 21S for turning ON/OFF the outputs from the antenna elements RxA1 and RxA2, a coefficient vector setting part 21 and a tap coefficient controller 22.

The switch 21S selects one of channels of the receiving antenna elements RxA1 and RxA2, and inputs the received signal to the corresponding channel of the coefficient vector setting part 21 formed by the factor multipliers 21W11 to 21W22 of 2×2 paths. The tap coefficient controller 22 comprises correlation detectors 22CD1 and 22CD2 for correlation-detecting the input signals $z_1$ and $z_2$ to the receivers 20R1 and 20R2, and a training sequence generator 22TS for supplying the correlation detectors 22CD1 and 22CD2 with the same training sequences as those transmitted.

The output from the training sequence generator 11TS of the transmitting side is fed via the switch 11S first to the transmitter 11T1. The transmitter 11T1 converts the training sequence to the transmitting frequency band through predetermined modulation. The output from the transmitter 11T1 is fed to the first element TxA1 of the transmitting antenna TxANT. The training sequence sent from the first element TxA1 is attenuated and phase-rotated by space and received by the receiving antenna RxANT.

In all of the factor multipliers 21W11 to 21W22 there are preset, for example, ones as initial values of the weighting factors $w_{11}$, $w_{12}$, $w_{21}$ and $w_{22}$. The first element RxA1 of the receiving antenna is selected by the receiving switch 21S, and the received training sequence is weighted by the factor multiplier 21W11 to an initial value 1. The thus weighted training sequence is provided to the correlation detector 22CD1, which obtain a correlation value ($\sigma_{11}^2$ by detecting the correlation between the input weighted training sequence and the training sequence which is generated by the training sequence generator 22TS and which is identical with the transmitted training sequence. The correlation value $\sigma_{11}^2$ thus obtained is stored in the controller 22C.

Next, the switch 11S of the transmitting side is held intact and the receiving antenna switch 21S is switched so that the training sequence transmitted from the transmitting antenna element RxA1 is received by the second element RxA2 of the receiving antenna. The received training sequence is weighted by the factor multiplier 21W21 to the initial value 1, and the weighted training sequence is provided to the correlation detector 22CD1, which detects a correction value $\sigma_{21}^2$ between the weighted training sequence and the training sequence from the training sequence generator 22TS. The correlation value $\sigma_{21}^2$ is stored in the controller 22C.

Next, the transmitter 11T2 is selected by the switch 11S, and as is the case with the transmitter 11T1, the training sequence sent from the transmitter 11T2 is received by the first element RxA1 of the receiving antenna RxANT, then the received signal is selected by the switch 21S and is provided via the factor multiplier 21W12 to the correlation detector 22CD2 to detect a correlation value $\sigma_{12}^2$ between the received signal and the training sequence, and the correlation value $\sigma_{12}^2$ is stored in the controller 22C. After this, the received signal by the second element RxA2 of the receiving antenna, selected by the switch 21S, is provided via the factor multiplier 21W22 to the correlation detector 22DC to detect the correlation between the received signal and the training sequence, and the thus obtained correlation value $\sigma_{22}^2$ is stored in the controller 22C.

As a result, a 2×2 received signal correlation matrix is obtained which is composed of the correlation values $\sigma_{11}^2$, $\sigma_{12}^2$, $\sigma_{21}^2$, $\sigma_{22}^2$ as its elements. Next, the correlation matrix is diagonalized by sequentially updating the weighting factors $w_{11}$, $w_{12}$, $w_{21}$ and $_{22}$ from the initial value by an adaptive algorithm so that the cross correlation elements $\sigma_{12}^2$ and $\sigma^{2l2}$ of the correlation matrix approach zero. The weighting factors $w_{11}$, $w_{12}$, $w_{21}$ and $w_{22}$ updated upon completion of diagonalization of the correlation matrix are final weighting factors.

The use of, for example, the M sequence of excellent orthogonality as the training sequence allows ease in detecting the training sequence at the receiving side.

While in the above the training sequence generator 11TS generates identical training sequences and provides them to the transmitters 11T1 and 11Ts, it is also possible that different orthogonal first and second training sequences are provided to the transmitters 11T1 and 11T2 and transmitted therefrom at the same time. In this case, the training sequence generator 22TS of the receiving side also generates the same first and second training sequences as those at the transmitting side, and provides them to the correlation detectors 22CD1 and 22CD2, respectively. As is the case with the above, the receiving antenna first selects the first element RxA1 by the switch 21S, and provides the received signals via the factor multipliers 21W11 and 21W12 to the correlation detectors 22CD1 and 22CD2, respectively. The correlation detectors 22CD1 and 22CD2 obtain the correlation values $\sigma_{11}^2$ and $\sigma_{12}^2$ between the received signals and the first and second training sequences from the training sequence generator 22TS, and the thus obtained correlation values $\sigma_{12}^2$ and $\sigma_{21}^2$ are stored in the controller 22C.

Next, the second element RxA2 of the receiving antenna is selected by the antenna switch 21S, and the received signals are provided via the factor multipliers 21W21 and 21W22 to the correlation detectors 22CD1 and 22CD2 to obtain the correlation values $\sigma_{21}^2$ and $\sigma_{22}^2$, which are stored in the controller 22C. As a result, a correlation matrix is obtained which is composed of four correlation values as its elements. Thereafter, as described above, the controller 22C updates weighting factors $w_{11}$, $w_{12}$, $w_{21}$ and $w_{22}$ sequentially from their initial values by an adaptive algorithm so that the correlation matrix is diagonalized. Such diagonalization of the correlation matrix of the received signals permits space multiplexing corresponding to the number of array antenna elements using the same frequency.

A description will be given below of an example in which N transmission signals are spatially multiplexed at the same frequency.

Its basic transmitting-receiving system is that shown in FIG. 1. In the receiving system the embodiments of FIGS. 6 and 7 can be used. The N transmitters 11T1 to 11TN independently generate transmission signals, and transmit them from the respective elements of the transmitting antenna at the same carrier frequency. Assume that the coefficient vector setting part 21, which generates an inverse transfer characteristic of the spatial transfer function of the receiving system, is so preset as to diagonalize the correlation matrix of the received signals by the training sequence. This enables the signals received by the N-element antenna to be separated into individual signals by the inverse spatial transfer functions implemented by the coefficient vector setting part 21. It is evident, therefore, that complete diagonalization of the correlation matrix could realize an N-fold increase in the frequency utilization efficiency.

Next, a description will be given below of the characteristics of the present invention in the case where the diagonalization of the correlation matrix is incomplete.

A correlation matrix $R_{zz}$ of a receiver input signal sequence z is given by the following equation (13).

$$R_{zz} = E[zz^H] = \begin{pmatrix} \sigma_{11}^2 & \sigma_{21}^2 & \cdots & \sigma_{N1}^2 \\ \sigma_{12}^2 & \sigma_{22}^2 & \cdots & \sigma_{N2}^2 \\ \vdots & \vdots & \ddots & \vdots \\ \sigma_{1N}^2 & \sigma_{2N}^2 & \cdots & \sigma_{NN}^2 \end{pmatrix} \quad (13)$$

where H indicates a complex conjugate transposition. From Equation (13) a desired to interference power ratio $\Gamma_m$ for each m-th received sequence can be obtained as follows:

$$\Gamma_m = \frac{\sigma_{mm}^2}{\sum_{n \neq m}^N \sigma_{nm}^2} \quad (14)$$

By diagonalization of the correlation matrix $R_{zz}$, the denominator of Equation (14) becomes zero and the desired to interference power ratio $\Gamma_m$ for each m-th received sequence becomes infinity. That is, interference is cancelled by the inverse transfer matrix. The amount of information transmitted to the N-channel receiving antenna at this time is the sum of the amounts of information transmitted in the respective channels. For instance, if the amounts of information transmitted in the respective channels are the same, the total amount of information transmitted is N-fold.

Figure 9:
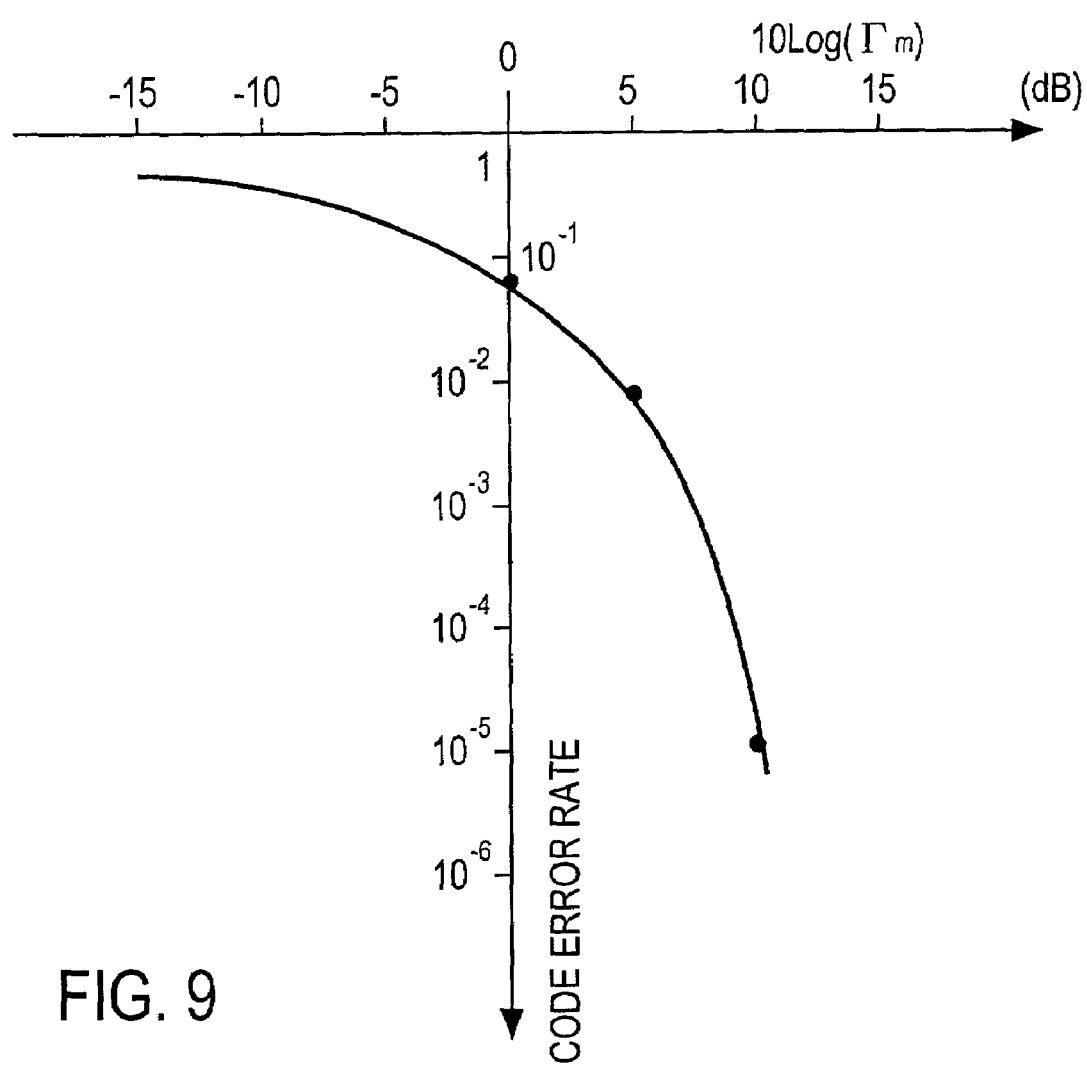
FIG. 9 is a graph showing the relationship between a desired to interference power ratio $\Gamma_m$ and a code error probability.

As described above, the frequency utilization efficiency by the present invention is based on the diagonalization of Equation (13). The transfer function between the transmitting and receiving antennas may sometimes dynamically vary due to fading. Further, in practice, there are cases where the inverse transfer function cannot be obtained. In view of this, a description will be given of an embodiment of the present invention in the case of incomplete diagonalization. In FIG. 9 the abscissa represents the interference power ratio $\Gamma_m$ expressed as Equation (14) and the ordinate represents the code error rate in an uncoded QPSK through a static channel where the signal to noise power ratio is infinite. If the desired to interference power ratio $\Gamma_m$ is 5 dB, the code error rate can be made about 1%. When the ratio $\Gamma_m$ is 10 dB, the code error rate becomes approximately $10^{-5}$. In contrast thereto, when the ratio $\Gamma_m$ is −5 dB and −10 dB, the code error rate goes beyond 10%. By improving the code error rate, the generation of the inverse function in the present invention can be achieved with more erase.

Figure 10:
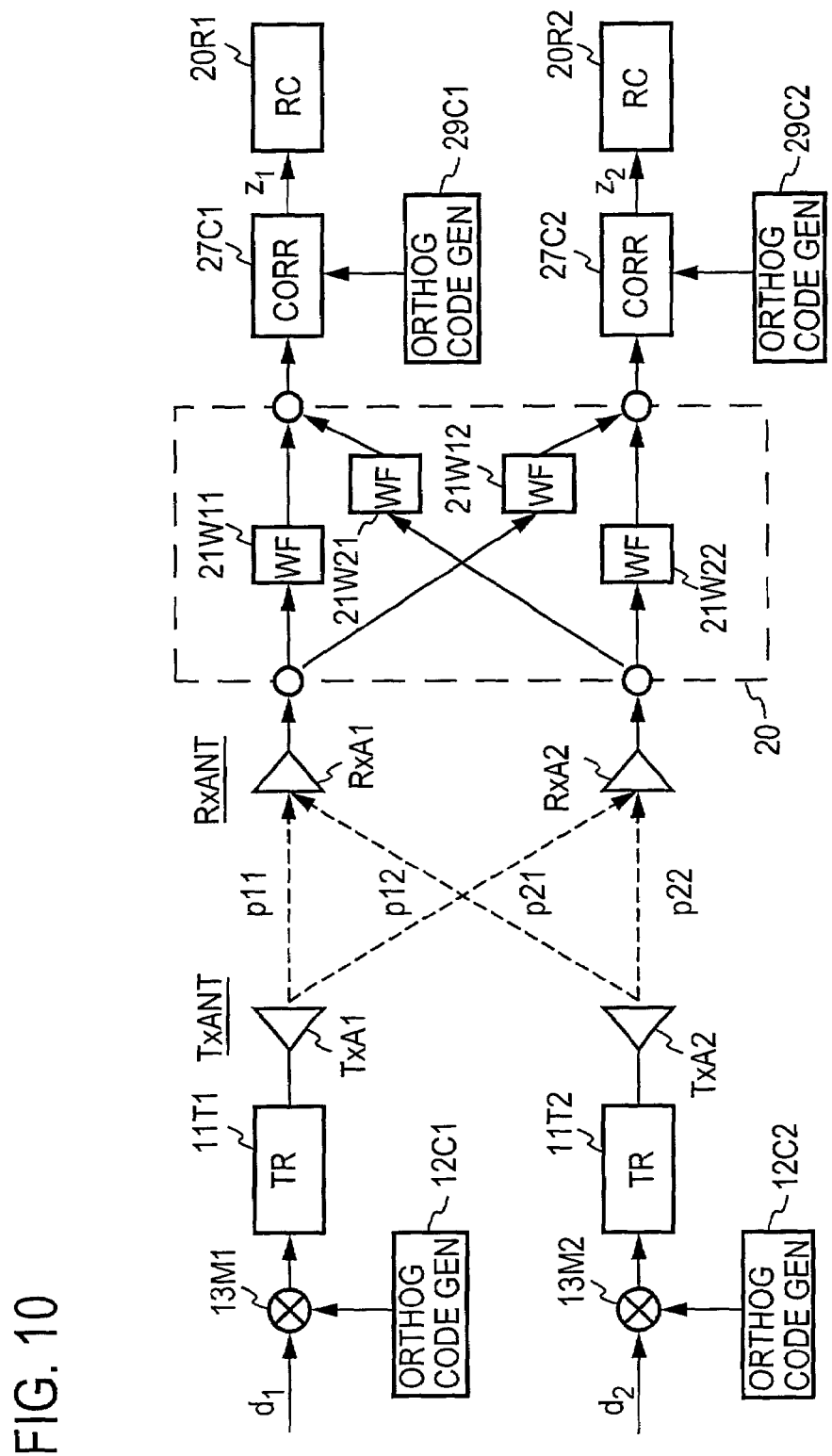
FIG. 10 is a block diagram depicting the configuration of a transmission/reception system using an orthogonal code.

The above can be achieved by increasing the orthogonality between transmitting channels through the use of orthogonal codes therein. As depicted in FIG. 10, at the transmitting side the pieces of data $d_1$ and $d_2$ to be sent are multiplied in multipliers 13M1 and 13M2 by orthogonal codes from orthogonal code generators 12C1 and 12C2, and the multiplied outputs are input to the transmitters 11T1 and 11T2. In the receiving side there are provided correlators 27C1 and 27C2 at the inputs of the receivers 20R1 and 20R2, and the correlators 27C1 and 27C2 detect the correlation between orthogonal codes from orthogonal code generators 29C1 and 29C2 and the received signals, by which the input signals $z_1$ and $z_2$ superimposed on the orthogonal codes are separated. This is an application of the spread spectrum communication method to the present invention. By this, it is possible to obtain a spreading gain based on the sequence length of the orthogonal code, allowing excellent communication even if interference between channels remains uncancelled.

Figure 11:
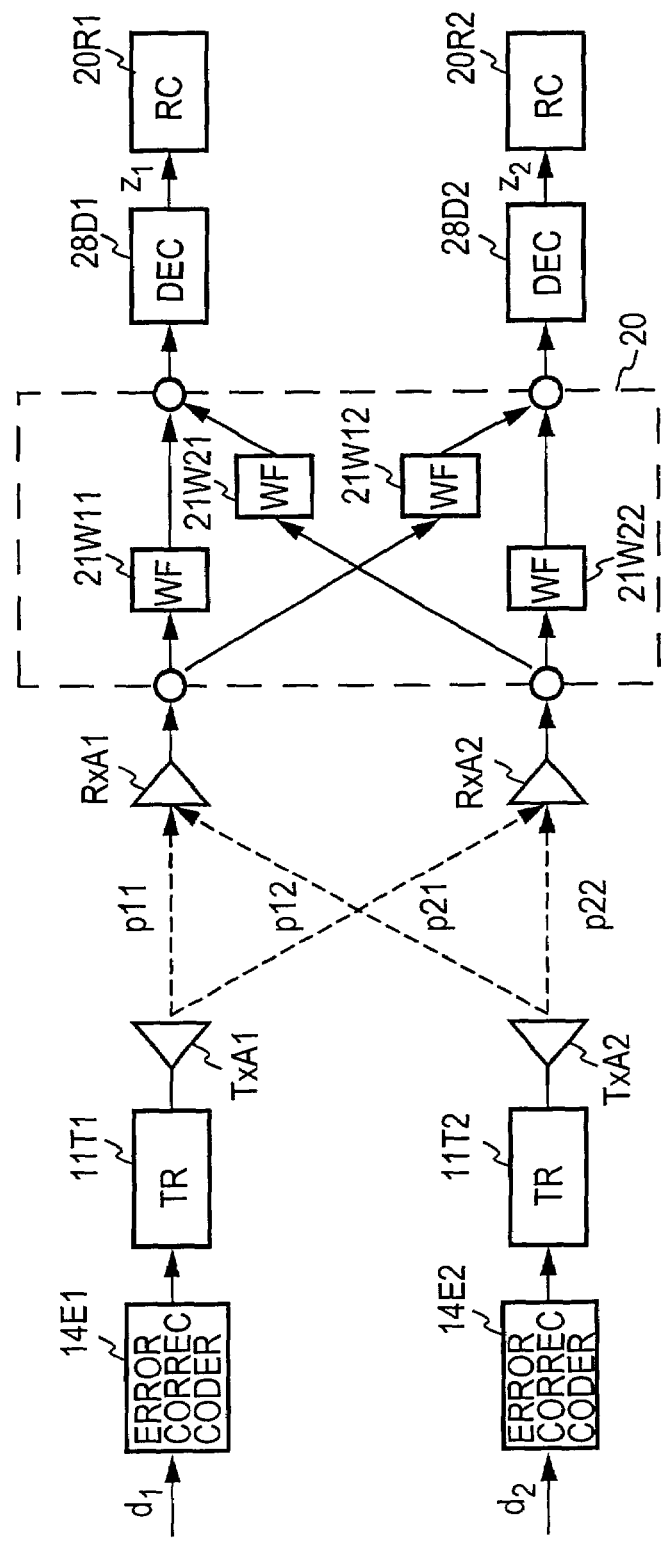
FIG. 11 is a block diagram depicting the configuration of a transmission/reception system using an orthogonal code.

FIG. 11 depicts an example that similarly employs an error correcting code.

At the transmitting side the pieces of input data $d_1$ and $d_2$ to be sent are encoded by error correcting coders 14E1 and 14E2 to error correcting codes, which are transmitted from the transmitters 11T1 and 11T2. At the receiving side respective channel outputs from the inter-channel interference canceller 20 are decoded by error correcting decoders 28D1 and 28D2 to obtain the received signals $z_1$ and $z_2$, which are applied to the receivers 20R1 and 20R2, respectively. The coders 14E1, 14E2 and the decoders 28D1, 28D2 may be those used commonly. For example, a convolution coder and a maximum likelihood sequence estimator may be used in combination. With the use of a method based on the principles described above in respect of FIG. 11, the code error rate to the desired to interference power ratio can be improved by the coding gain. Thus, the use of the correcting code permits excellent communication even if inter-channel interference remains uncancelled.

Now, a description will be given of examples of the transmitting antenna elements TxA1 to TxAN and the receiving antenna elements RxA1 to RxAN for use in the present invention. The transmitting antenna in this case is, for example, a 4-element array antenna, and as depicted in FIG. 12A, the transmitting antenna elements TxA1 to TxA4 are arranged in a geometrical form. Assume, for brevity sake, that the receiving antenna is identical with the transmitting antenna. The inverse coefficient matrix that is generated at the receiving side is determined by the path difference between known signal sequences transmitted from the respective transmitting antenna elements and received by the respective receiving antenna elements. This path difference is the phase difference corresponding to Equation (1). Since the respective elements of the receiving antenna are arranged in a geometric form, it is possible to detect the phase difference, for instance, between signals received by the receiving antenna elements RxA2 to RxA4 and the signal received by the element RxA1. The attenuation coefficient can be known from the received power detected by each element of the receiving antenna. The transmitting array antenna and the receiving array antenna may also be patch antennas as depicted in FIG. 12B.

Figure 13B:
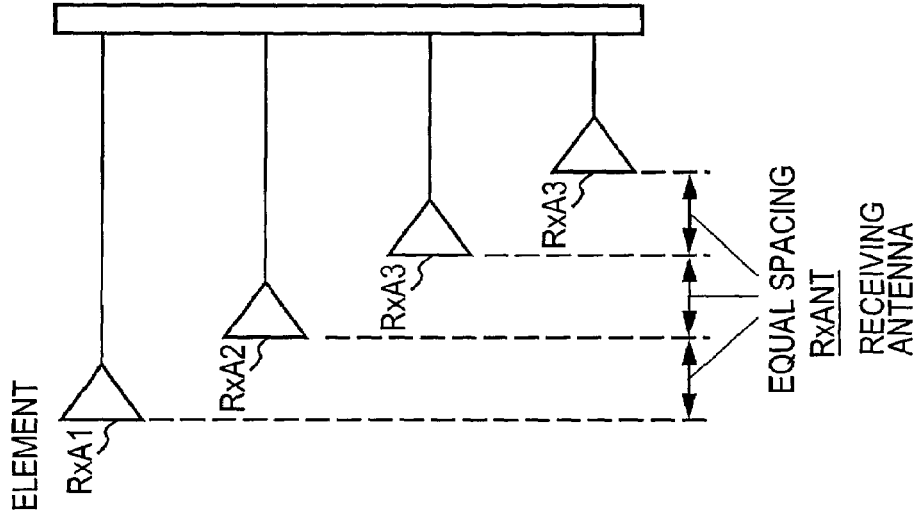
FIG. 13 is a diagram showing other examples of the transmitting and receiving antennas according to the present invention.
Figure 13A:
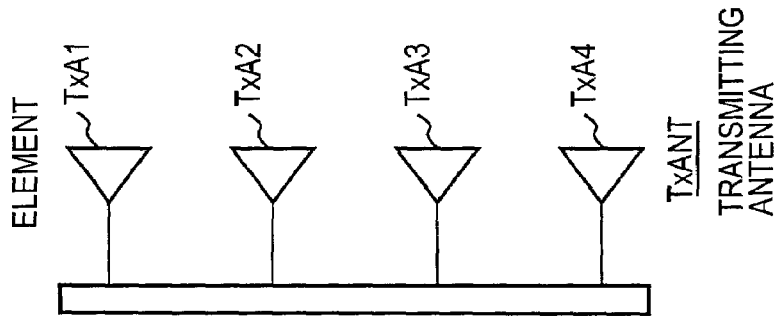

Similarly, by equally spacing the elements TxA1 to TxA4 and RxA1 to RxA4 of the transmitting and receiving antennas TxANT and RxANT as shown in FIGS. 13A and 13B, the phase difference between the respective elements can be made large equivalently—this facilitates detection of the phase difference at the receiving side. Accordingly, the transmitting and receiving antennas may be, for instance, array antennas of geometric form in which the elements are equally spaced.

In the above, the principles of the present invention have been described on the assumption that the number of transmitting channels and the number of receiving channel are equal. According to the principles of the invention, the number of receiving channels may be larger than the number of transmitting channels. The reason for this is that when the number of independent receiving channels is larger than the number of transmitting channels, the tap coefficient matrix to be set in the channel canceller can be calculated mathematically.

EFFECT OF THE INVENTION

As described above, according to the present invention, by determining the coefficient vector in the inter-channel interference canceller of the receiving side so that the cross correlation between the received signals becomes minimized, the received signals of the respective channels can be separated. This permits multiplex transmission of signals of plural channels at the same frequency from the transmitting side, providing increased frequency utilization efficiency.

What is claimed is:

1. An N-channel space multiple radio communication method comprising the steps of:
   (a) generating transmission signals of N channels frequency converted to the same transmitting frequency by N independent transmitters, said N being an integer equal to or greater than 2, and providing said transmission signal of said N channels to N elements of a transmitting antenna for transmission therefrom; and
   (b-1) receiving said transmission signals of said N channels by N elements of a receiving antenna to generate N received signals;
   (b-2) dividing each of the N received signals into N divided signals corresponding to the N channels;
   (b-3) multiplying the N divided signals by N weighting factors, respectively, to produce N weighted signals for each of said N received signals, and
   (b-4) combining N weighted signals corresponding to each of the N channels to reconstruct the transmission signal of corresponding one of said N channels;
   wherein said step (a) includes a step of transmitting a known training sequence from each of the N elements of said transmitting antenna, sequentially;
   wherein said step (b-1) includes a step of setting all of the weighting factors to given values and a step of receiving, for each of the transmissions of the known training sequence from the N elements of said transmitting antenna, a known training sequence by successive selection of one of said N elements of said receiving antenna corresponding to one of the N channels to produce N received training sequences as said N received signals;
   said step (b-2) includes a step of dividing each of said N received training sequence into N divided training sequences corresponding to the N channels;
   said step (b-3) includes a step of multiplying the N divided training sequences by said N weighing factors, respectively, to produce N weighted training sequences for each of the N received training sequences; and
   said step (b-4) includes a step of obtaining correlation between each of the weighted training sequences and the known training sequence generated at the receiving side to thereby produce a correlation matrix of N×N elements, and a step of converging the weighting factors by an adaptive algorithm so that elements other than diagonal elements of said correlation matrix approach zero to thereby minimize cross correlation between said N received signals.

2. The N-channel space multiple radio communication method according to claim 1, wherein:
   said step (b-1) includes a step of frequency converting said N received signals from said N elements to N low-frequency signals and a step of converting said N low-frequency signals to N digital signals;
   said step (b-2) includes a step of dividing each of said N digital signals to N divided signals, respectively, to generate digital signals of N×N paths;
   said step (b-3) includes a step of multiplying said digital signals of said N×N paths by weighting factors, respectively, to generate weighted digital signals of N×N paths; and said step (b-4) includes a step of combining said weighted digital signals of said N×N paths for every N signals corresponding to said N channels to generate N digital combined signals as signals corresponding to said received signals of said N-channels.

3. A radio communication apparatus comprising:
N independent transmitters, said N being an integer equal to or greater than 2;
a transmitting side training sequence generator for generating a known training sequence;
a switch for providing said training sequence to said N independent transmitters, sequentially;
a transmitting antenna provided with N elements which are supplied with N transmitter outputs, respectively;
a receiving antenna provided with N elements for producing N received signals;
an N-input-N-output inter-channel interference canceller, supplied with the N received signals from said N elements of said receiving antenna, for dividing each of said N received signals to N divided signals of N×N paths, for weighting said N divided signals of said N×N paths, and for combining said weighted N signals for every N channels to generate N-channel combined signals; and
a select switch for providing a received known training sequence sequentially from the N elements of said receiving antenna to corresponding one of the N inputs of said inter-channel interference canceller, respectively;
wherein said inter-channel interference canceller comprises:
N power dividers each for dividing one of the N received signals to N divided signals corresponding to the N channels, thereby producing divided signals of N×N paths;
weighting factor multipliers for weighting said divided signals of said N×N paths by weighting factors, respectively, to generate weighted signals of N×N paths;
N power combiners for combining said weighted signals of said N×N paths for every N corresponding to said N channels to obtain N-channel combined signals as signals corresponding to said N-channel transmitted signals;
a receiving side training sequence generator for generating the known training sequence;
a correlation detector for detecting correlation between each of weighted training sequences provided thereto as the weighted signals and the known training sequence generated by said receiving side training sequence generator to obtain a correlation matrix of N×N elements; and
a controller for determining the weighting factors of said N×N paths so that the elements other than diagonal elements of said correlation matrix approach zero whereby the cross correlation coefficient between said N-channel combined signals is minimized.

4. The apparatus of claim 3, wherein the element spacing of at least one of said transmitting antenna provided with said N elements and said receiving antenna provided with said N elements is constant.

5. The radio communication apparatus according to claim 3, further comprising:
N frequency converters for frequency converting said N received signals from said N elements to N low-frequency signals; and
N A/D converters for converting said N low-frequency signals to N digital signals to be supplied as inputs to said inter-channel interference canceller.

6. A method for receiving N-channel space multiplex signals transmitted from N elements of a transmitting antenna, said method comprising the steps of:
(a) receiving N-channel transmitted signals by N elements of a receiving antenna to generate N received signals;
(b) dividing each of said N received signals into N divided signals corresponding to the N channels to obtain signals of N×N paths;
(c) multiplying said signals of said N×N paths by weighting factors, respectively, to produce weighted signals of N×N paths; and
(d) combining said weighted signals for every N channels to obtain N-channel combined signals;
wherein said step (a) includes a step of setting all of the weighting factors to given values and a step of receiving, for each of transmissions of a known training sequence sequentially from N elements of a transmitting antenna, the known training sequence by successive selection of one of said N elements of said receiving antenna corresponding to one of the N channels to produce N received training sequences as said N received signals;
said step (b) includes a step of dividing each of said N received training sequence into N divided training sequences corresponding to the N channels;
said step (c) includes a step of multiplying the N divided training sequences by said N weighing factors, respectively, to produce N weighted training sequences for each of the N received training sequences; and
said step (d) includes a step of obtaining correlation between each of the weighted training sequences and the known training sequence generated at the receiving side to thereby produce a correlation matrix of N×N elements, and a step of converging the weighting factors by an adaptive algorithm so that elements other than diagonal elements of said correlation matrix approach zero to thereby minimize cross correlation between said N received signals.

7. The receiving method of claim 6, wherein said step (a) includes the steps of:
(a-1) frequency converting said N received signals from said N elements to N low-frequency signals; and
(a-2) converting said N low-frequency signals to N digital signals;
wherein said step (b) is a step of dividing said N digital signals to digital signals of N×N paths, and said step (c) is a step of multiplying said digital signals of said N×N paths by weighting factors to generate weighted digital signals of N×N paths, and said step (d) is a step of combining said weighted digital signals of said N×N paths for every N signals corresponding to said N channels to obtain N digital combined signals as signals corresponding to said N-channel received signals.

8. An apparatus for receiving N-channel transmitted signals from N elements of a transmitting antenna, said apparatus comprising:
a receiving antenna provided with N elements for producing N received signals, said N being an integer equal to or greater than 2;
an N-input-N-output inter-channel interference canceller supplied with said N received signals from said N elements of said receiving antenna, for dividing each of said N received signals to N divided signals of N×N paths, for weighting said N divided signals of said N×N paths, for combining said weighted N signals for every N channels to generate N-channel combined signals;

a select switch for providing a received known training sequence sequentially from the N elements of said receiving antenna to corresponding one of the N inputs of said inter-channel interference canceller, respectively;

wherein said inter-channel interference canceller comprises:

N power dividers each for dividing one of the N received signals to N divided signals corresponding to the N channels, thereby producing divided signals of N×N paths;

weighting factor multipliers for weighting said divided signals of said N×N paths by weighting factors, respectively, to generate weighted signals of N×N paths;

N power combiners for combining said weighted signals of said N×N paths for every N corresponding to said N channels to obtain N-channel combined signals as signals corresponding to said N-channel transmitted signals;

a receiving side training sequence generator for generating the known training sequence;

a correlation detector for detecting correlation between each of weighted training sequences provided thereto as the weighted signals and the known training sequence generated by said receiving side training sequence generator to obtain a correlation matrix of N×N elements; and a controller for determining the weighting factors of said N×N paths so that the elements other than diagonal elements of said correlation matrix approach zero whereby the cross correlation coefficient between said N-channel combined signals is minimized.

9. The receiving apparatus of claim 8, wherein the element spacing of said receiving antenna provided with said N elements is constant.

10. The receiving apparatus of claim 8, further comprising:

N frequency converters for frequency converting said N received signals from said N elements to N low-frequency signals, respectively; and N A/D converters for converting said N low-frequency signals to N digital signals to be supplied as inputs to said inter-channel interference canceller.

* * * * *